United States Patent
Manji et al.

(10) Patent No.: US 12,193,359 B2
(45) Date of Patent: Jan. 14, 2025

(54) WORK VEHICLE

(71) Applicant: Kubota Corporation, Osaka (JP)

(72) Inventors: Yasuhiro Manji, Sakai (JP); Tomohiko Hisakuni, Sakai (JP)

(73) Assignee: Kubota Corporation, Osaka (JP)

( * ) Notice: Subject to any disclaimer, the term of this patent is extended or adjusted under 35 U.S.C. 154(b) by 600 days.

(21) Appl. No.: 17/531,272

(22) Filed: Nov. 19, 2021

(65) Prior Publication Data

US 2022/0312668 A1 Oct. 6, 2022

(30) Foreign Application Priority Data

Mar. 30, 2021 (JP) .................................. 2021-057064

(51) Int. Cl.
*A01D 34/00* (2006.01)
*A01D 34/66* (2006.01)
*A01D 34/68* (2006.01)
*B60T 11/04* (2006.01)
*B62D 11/18* (2006.01)

(52) U.S. Cl.
CPC ........... *A01D 34/008* (2013.01); *A01D 34/66* (2013.01); *B60T 11/04* (2013.01); *B62D 11/183* (2013.01); *A01D 2034/6843* (2013.01)

(58) Field of Classification Search
CPC ......... B62D 11/02; B62D 11/04; B62D 11/12; B62D 1/12; B60T 11/04; A01D 2034/6843; A01D 69/10
USPC .................. 180/6.3, 6.48, 6.5, 333
See application file for complete search history.

(56) References Cited

U.S. PATENT DOCUMENTS

| | | | |
|---|---|---|---|
| 6,434,917 B1 | 8/2002 | Bartel | |
| 6,708,805 B2 | 3/2004 | Samejima et al. | |
| 9,313,953 B2 | 4/2016 | Borshov et al. | |
| 2003/0046915 A1 | 3/2003 | Samejima et al. | |
| 2004/0050026 A1* | 3/2004 | Stover ................... | A01D 69/10 56/11.3 |
| 2008/0190084 A1 | 8/2008 | Piontek | |
| 2009/0000839 A1* | 1/2009 | Ishii ...................... | B62D 11/04 701/41 |
| 2019/0270435 A1 | 9/2019 | Matsuura et al. | |

FOREIGN PATENT DOCUMENTS

| | | |
|---|---|---|
| JP | 200372528 A | 3/2003 |
| JP | 2005271799 A | 10/2005 |
| JP | 2019151266 A | 9/2019 |

* cited by examiner

*Primary Examiner* — Christopher B Wehrly
(74) *Attorney, Agent, or Firm* — The Webb Law Firm (57) ABSTRACT

A self-driving work vehicle includes: a front wheel unit; a rear wheel unit including a left rear wheel and a right rear wheel; a variable traveling power supply apparatus that supplies rotational drive power to the left rear wheel and the right rear wheel independently; a left operation implement movable along a first path to adjust a rate of the rotational drive power to be supplied to the left rear wheel from the variable traveling power supply apparatus; a right operation implement movable along a second path to adjust a rate of the rotational drive power to be supplied to the right rear wheel from the variable traveling power supply apparatus; a parking brake provided for the variable traveling power supply apparatus; and a controller configured or programmed to cause a parking brake operating module to operate the parking brake.

3 Claims, 5 Drawing Sheets

WORK VEHICLE

CROSS REFERENCE TO RELATED APPLICATION

This application claims priority to Japanese Patent Application No. 2021-057064 filed Mar. 30, 2021, the disclosure of which is hereby incorporated by reference in its entirety.

BACKGROUND OF THE INVENTION

1. Field of the Invention

The present invention relates to a self-driving work vehicle.

2. Description of the Related Art

U.S. Pat. No. 6,708,805 discloses a riding-type mowing machine including left and right rear wheels, a left travel lever that adjusts the speed of the left rear wheel, a right travel lever that adjusts the speed of the right rear wheel, and a brake apparatus. The brake apparatus operates by a brake lever or a brake pedal being manipulated. When a driver manipulates the left travel lever and the right travel lever to a neutral position and depresses the brake pedal, the brake apparatus operates as a parking brake. However, it is conceivable that the driver will forget to apply the parking brake when exiting the vehicle. It is also conceivable that a driver who plans to return to the work vehicle soon, and therefore opts not to apply the parking brake upon exiting the vehicle, does not actually return to the work vehicle soon, and instead leaves the work vehicle for a long period of time without the parking brake applied. Having been conceived of to solve the above-described problem to the greatest extent possible, the present invention provides a self-driving work vehicle in which a parking brake appropriately enters an operational state.

SUMMARY OF THE INVENTION

A self-driving work vehicle of the present invention includes: a front wheel unit; a rear wheel unit including a left rear wheel and a right rear wheel; a variable traveling power supply apparatus that supplies rotational drive power to the left rear wheel and the right rear wheel independently; a left operation implement movable along a first path to adjust a rate of the rotational drive power to be supplied to the left rear wheel from the variable traveling power supply apparatus; a right operation implement movable along a second path to adjust a rate of the rotational drive power to be supplied to the right rear wheel from the variable traveling power supply apparatus; a parking brake provided for the variable traveling power supply apparatus; and a controller configured or programmed to cause a parking brake operating module to operate the parking brake in response to (i) the left operation implement being moved to a third path branching from the first path and (ii) the right operation implement being moved to a fourth path branching from the second path.

According to this configuration, the driver operates the parking brake (brake on) by moving the operation implement along the third path or the fourth path, instead of along the first path or the second path which are used to change the speed or heading of the vehicle body. In other words, the driver can operate the parking brake by switching from operating the operation implements in the paths for changing the vehicle speed, which are always maintained when driving, to operating the operation implements in different paths. That is, when operating the parking brake, there is no need to operate a dedicated parking brake operation implement, which simplifies the operation of the parking brake. This makes it possible to avoid a situation where the driver forgets to apply the parking brake when exiting the vehicle, and realizes a self-driving work vehicle in which the parking brake enters the operational state appropriately.

In one preferred embodiment of the present invention, in the self-driving work vehicle, movement of the left operation implement along the third path and movement of the right operation implement along the fourth path expand an exit passage for a driver to exit the self-driving work vehicle.

According to this configuration, the movement of the left operation implement along the third path and the movement of the right operation implement along the fourth path expands the exit passage for the driver, which makes it possible for the driver to exit smoothly. To exit the vehicle, the driver inevitably moves the left operation implement along the third path, and inevitably moves the right operation implement along the fourth path. The parking brake operates as a result, which even more reliably avoids a situation where the driver forgets to apply the parking brake when exiting the vehicle.

In one preferred embodiment of the present invention, in the self-driving work vehicle, the third path has a first detection position, the fourth path has a second detection position, and the controller is configured or programmed to cause the parking brake operating module to operate the parking brake in response to (i) the left operation implement being moved to the first detection position and (ii) the right operation implement being moved to the second detection position.

If the arrival of the operation implements at specific positions (the first detection position and the second detection position) in the movement paths is set in advance as a trigger to operate the parking brake, the parking brake can be operated in a reliable and stable manner. The arrival of the operation implements at the specific positions (the first detection position and the second detection position) can be detected easily and inexpensively using limit switches or the like.

In one preferred embodiment of the present invention, in the self-driving work vehicle, in an operational state of the parking brake, the parking brake becomes released in response to either or both of (i) the left operation implement being moved out of the first detection position and (ii) the right operation implement being moved out of the second detection position.

A parking brake in an operational (brake on) state must be released (brake off) when resuming driving. In order for the driver to board the vehicle and start driving, it is necessary for the driver to return the operation implements to the paths for adjusting the vehicle speed, and move the operation implements along those paths. In other words, it is necessary for the driver to move the operation implements to the paths for adjusting the vehicle speed from the specific positions (the first detection position and the second detection position) that served as triggers for operating the parking brake. According to this configuration, the driver moves the operation implements from the specific positions (the first detection position and the second detection position) to the paths for adjusting the vehicle speed, and the parking brake is released in the process of the operation implements moving, and there is thus no waste in the driver's movement to resume driving.

In one preferred embodiment of the present invention, in the self-driving work vehicle, in an operational state of the parking brake, the parking brake becomes released in response to either or both of (i) the left operation implement being moved from a neutral position in a predetermined range along the first path and (ii) the right operation implement being moved from a neutral position in a predetermined range along the second path.

When parked on an incline or the like, there is a risk that the vehicle body will start moving when the parking brake is released. Accordingly, it is preferable to release the parking brake when the driver attempts to move the vehicle body, or just before. By setting the predetermined ranges appropriately, the parking brake can be released at the moment drive power is transmitted to the wheels, or just before drive power is transmitted to the wheels.

In one preferred embodiment of the present invention, in the self-driving work vehicle, in an operational state of the parking brake, the parking brake becomes released in response to at least either of (i) the left operation implement being moved from a neutral position to exceed a predetermined movement rate along the first path and (ii) the right operation implement being moved from a neutral position to exceed a predetermined movement rate along the second path.

When the driver attempts to move the vehicle body, the operation implements are moved with a certain degree of acceleration. If the operation implements are slowly moved in a manner that is not such intentional operation, it is highly likely that parking brake need not be released. Such a configuration is therefore also advantageous.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Embodiments serving as examples of the present invention will be described hereinafter on the basis of the drawings. Note that in the following descriptions, with respect to a traveling vehicle body of a riding-type mowing machine (an example of a "self-driving work vehicle"), the direction of arrow F in FIGS. 1 and 2 is a "vehicle body front", the direction of arrow B is a "vehicle body rear", the direction of arrow U in FIG. 1 is a "vehicle body top", the direction of arrow D is a "vehicle body bottom", the direction of arrow L in FIG. 2 is a "vehicle body left", and the direction of arrow R is a "vehicle body right".

Figure 1:
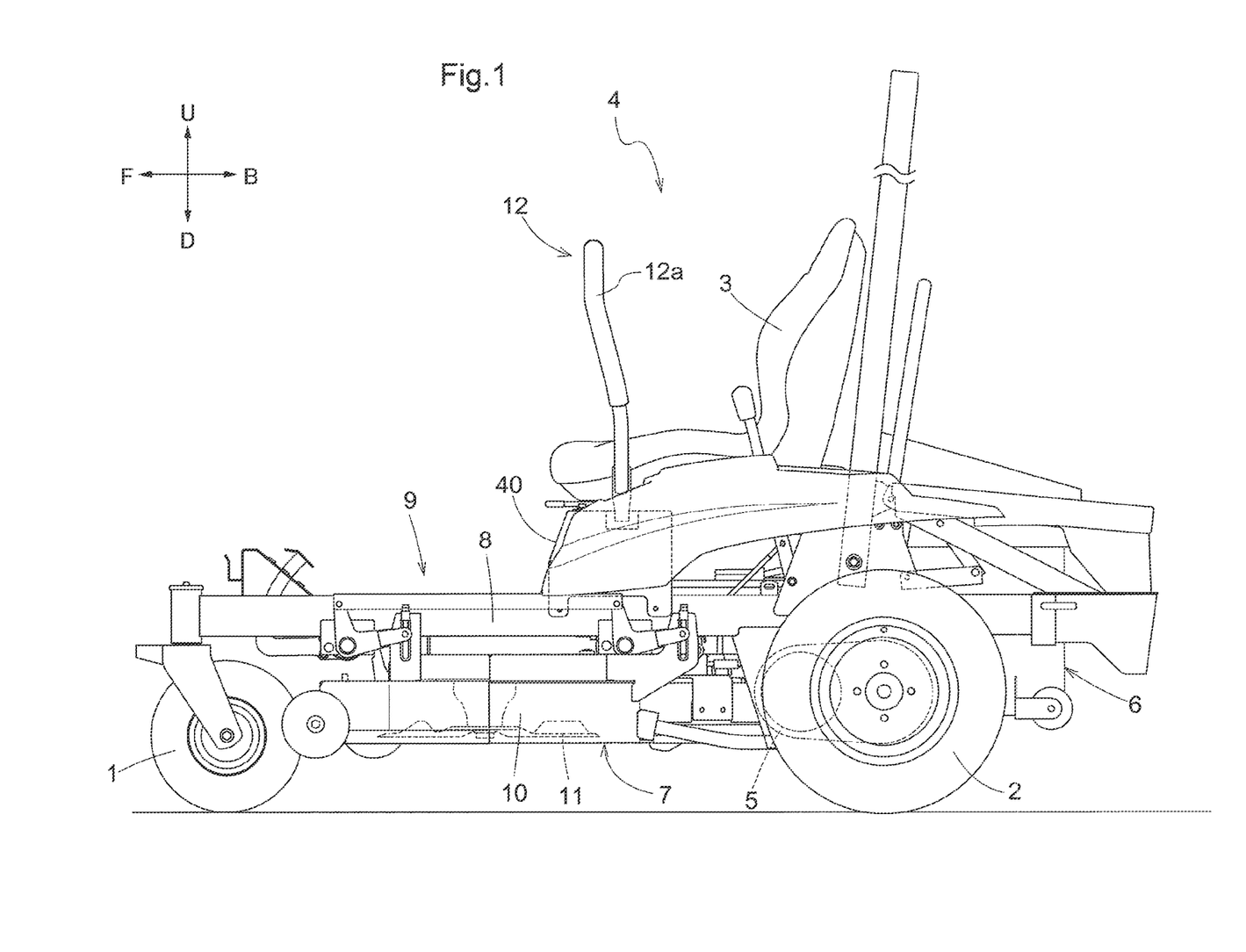
FIG. 1 is a left side view illustrating an overview of a riding-type mowing machine.
Figure 2:
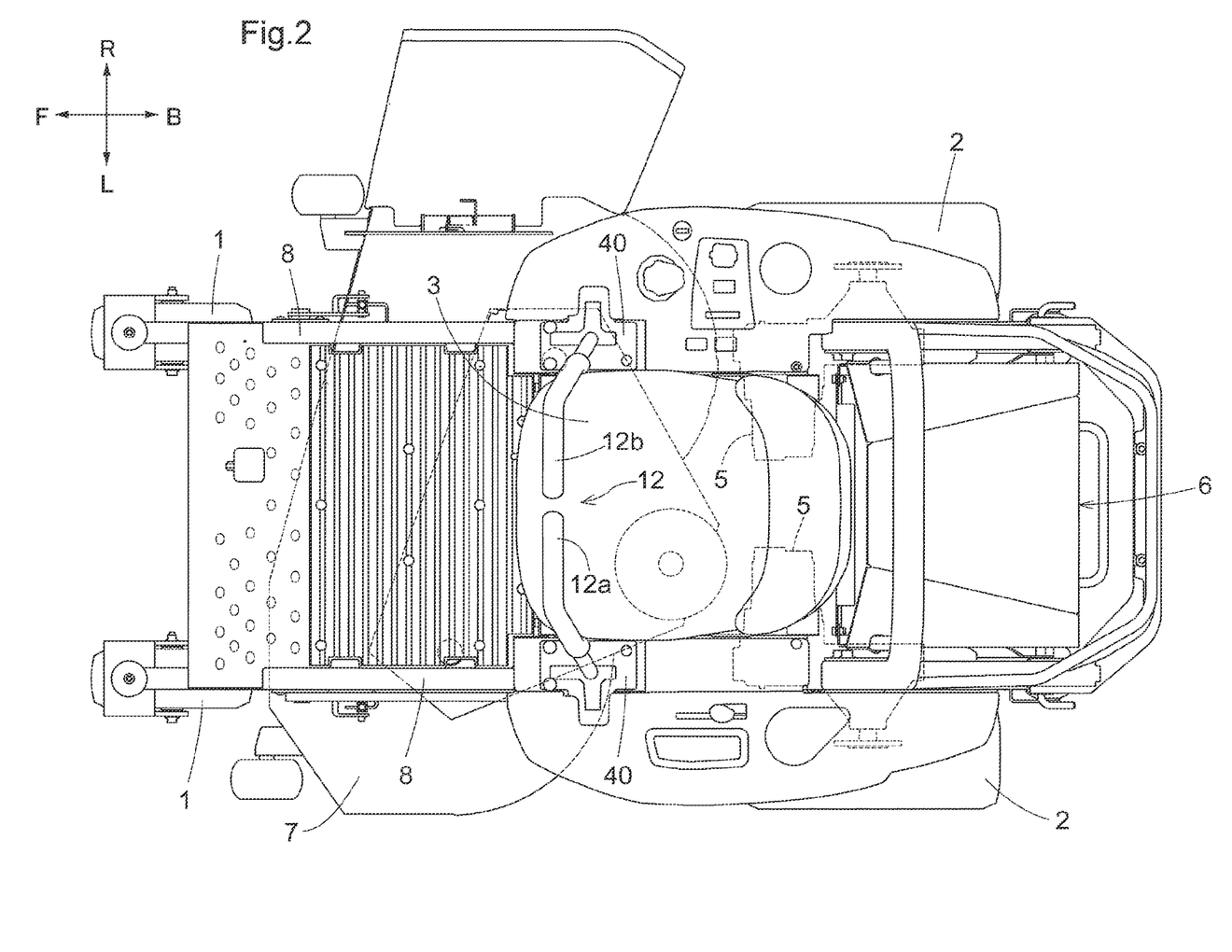
FIG. 2 is a plan view illustrating an overview of the riding-type mowing machine.

As illustrated in FIGS. 1 and 2, the riding-type mowing machine includes a traveling vehicle body. The traveling vehicle body has a vehicle body frame 8. The traveling vehicle body is equipped with a front wheel unit 1 including left and right front wheels that are idly rotatable and a rear wheel unit 2 capable of driving. The front wheels are caster wheels. The rear wheel unit 2 has a left rear wheel and a right rear wheel. A driver's section 4 is formed at the front of the traveling vehicle body, and the driver's section 4 has a driver's seat 3. A travel motor unit 5 is provided below the driver's section 4. The travel motor unit 5 includes a left motor and a right motor. The left motor supplies rotational drive power to the left rear wheel, and the right motor supplies rotational drive power to the right rear wheel. In other words, the left motor and the right motor supply rotational drive power independently to the left rear wheel and the right rear wheel, respectively. A battery pack 6 is provided at the rear of the traveling vehicle body. The battery pack 6 supplies power to the travel motor unit 5. A mowing apparatus 7 is provided between the front wheel unit 1 and the rear wheel unit 2. The mowing apparatus 7 is supported by the vehicle body frame 8 via a link mechanism 9. The link mechanism 9 raises and lowers the mowing apparatus 7 relative to the traveling vehicle body. The mowing apparatus 7 includes a mowing blade housing 10 and a mowing blade 11. The mowing blade 11 is provided within the mowing blade housing 10, and is capable of being rotationally driven with a support shaft (not shown), which is parallel to the vertical direction of the vehicle body, serving as the rotational center.

As illustrated in FIGS. 1 and 2, the driver's section 4 is provided with an operation lever unit 12. A driver adjusts the vehicle speed and heading of the traveling vehicle body while manipulating the operation lever unit 12. The operation lever unit 12 includes a left operation lever 12a (an example of a left operation implement) and a right operation lever 12b (an example of a right operation implement). The left operation lever 12a and the right operation lever 12b are provided on respective sides of the driver's seat 3. A floor plate is formed in front of the driver's seat 3. The driver gets on or off the vehicle by passing between the left operation lever 12a and the right operation lever 12b, and the floor plate in front of the driver's seat 3.

Figure 3:
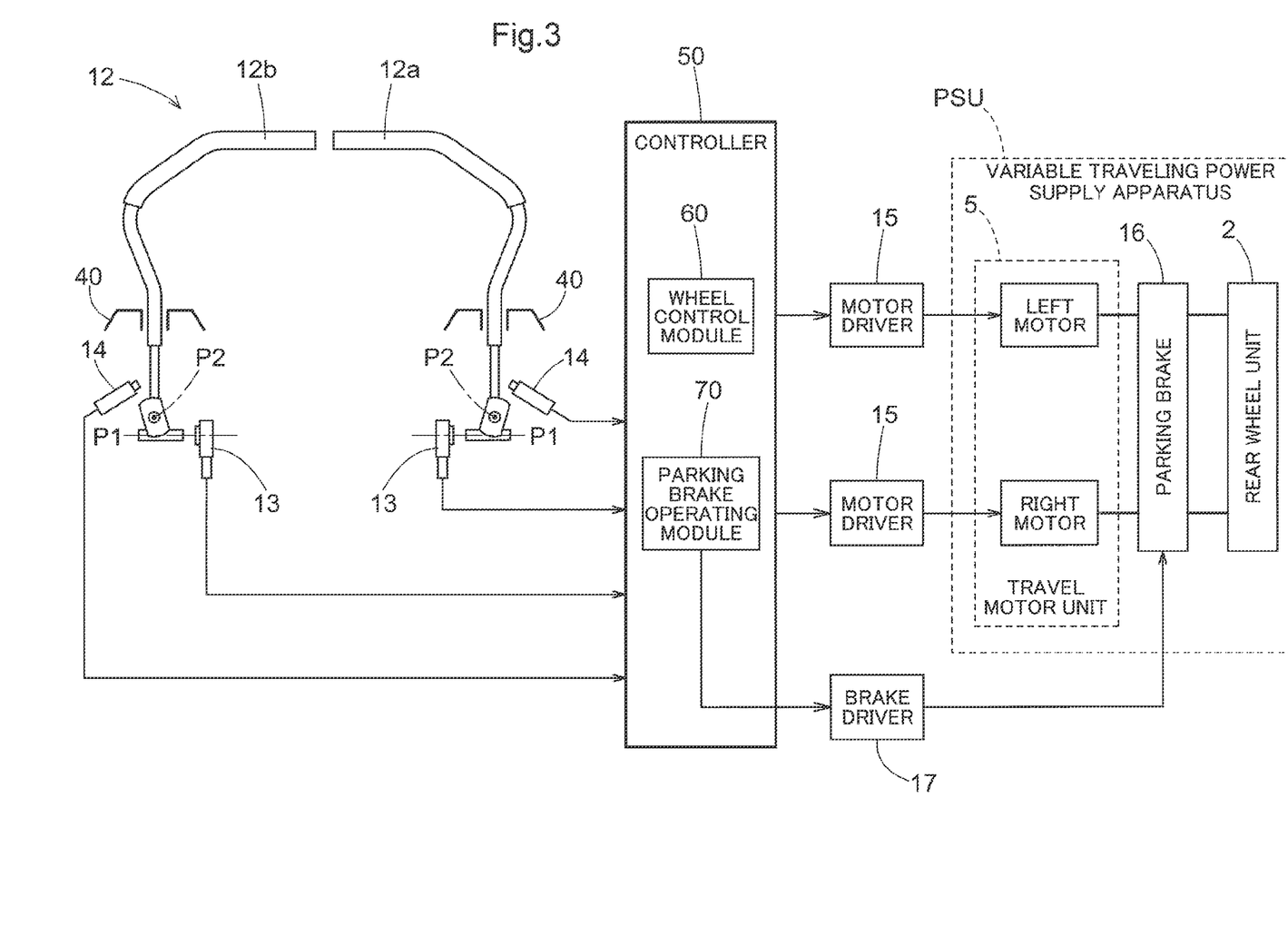
FIG. 3 is a function block diagram illustrating a control system related to an operation lever unit.

As illustrated in FIG. 3, the left operation lever 12a and the right operation lever 12b both swing and move about a first swing axes P1, respectively. This swinging movement is movement in a front-back direction of the vehicle body, and will be called "longitudinal movement". The left operation lever 12a and the right operation lever 12b also swing and move about respective second swing axes P2. This swinging movement is movement in a lateral direction of the vehicle body, and will be called "lateral movement".

Figure 4:
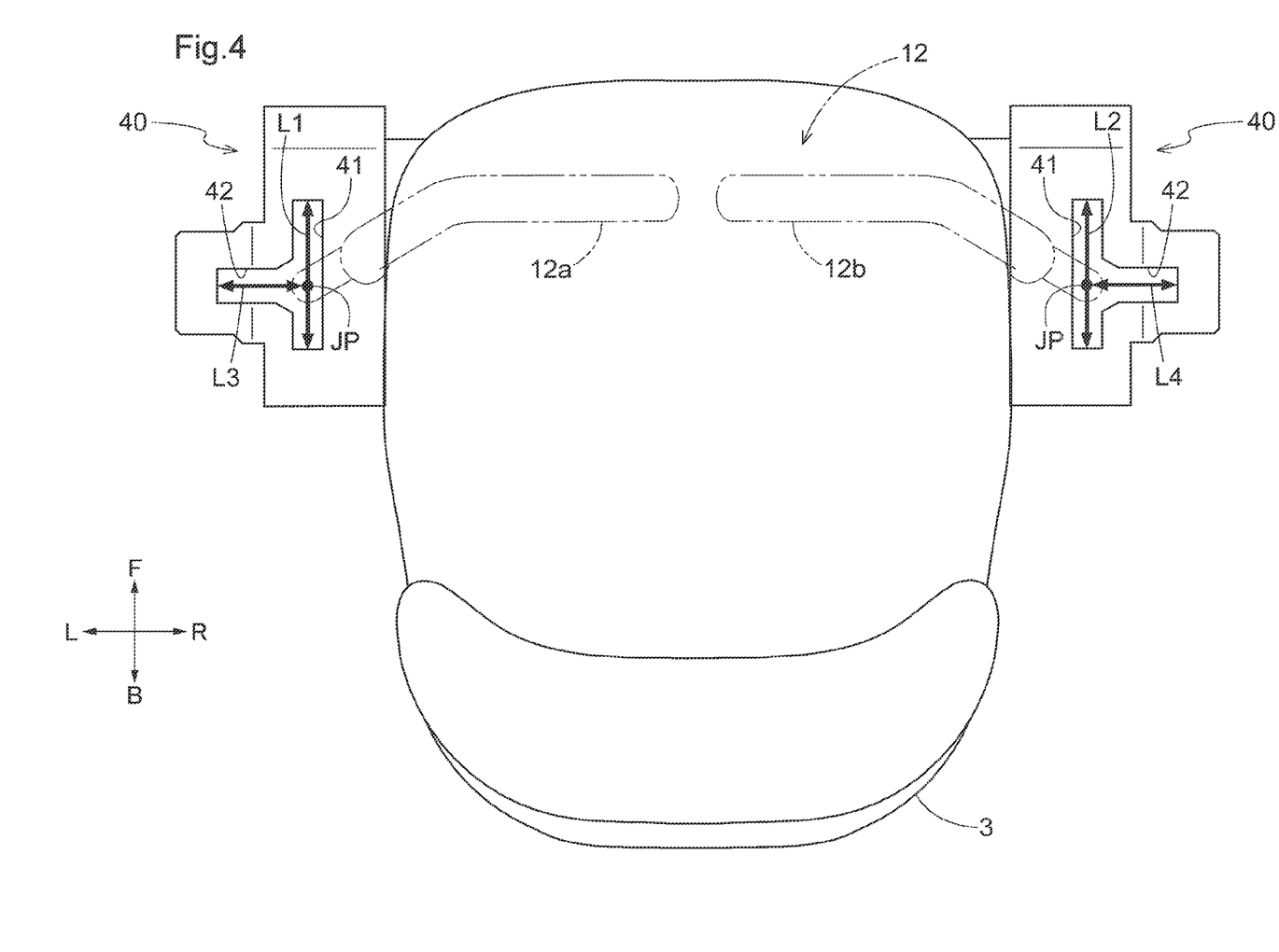
FIG. 4 is a plan view illustrating a guide unit that guides an operation lever.

As illustrated in FIGS. 3 and 4, guide units 40 are provided to ensure the operation lever unit 12 moves (swings) in a stable manner. The left and right guide units 40 guide the respective base ends of the left operation lever 12a and the right operation lever 12b. Each guide unit 40 is a plate structure, with a longitudinal guide slot 41 and a lateral guide slot 42 formed in an upper surface of the guide unit 40. The longitudinal guide slot 41 on the left side of the vehicle body guides the longitudinal movement of the left operation lever 12a. The longitudinal guide slot 41 on the right side of the vehicle body guides the longitudinal movement of the right operation lever 12b. The lateral guide slot 42 on the left side of the vehicle body guides the lateral movement of the left operation lever 12a. The lateral guide slot 42 on the right side of the vehicle body guides the lateral movement of the right operation lever 12b. The longitudinal guide slot 41 is connected to the lateral guide slot 42 in a central part of the longitudinal guide slot 41.

As illustrated in FIG. 4, the left operation lever 12a is guided by the longitudinal guide slot 41 to move longitudinally, and is guided by the lateral guide slot 42 to move laterally. Additionally, the right operation lever 12b is guided by the longitudinal guide slot 41 to move longitudinally, and is guided by the lateral guide slot 42 to move laterally. A path of the longitudinal movement of the left operation lever 12a will be called a first path L1, and a path of the longitudinal movement of the right operation lever 12b will be called a second path L2. A path of the lateral movement of the left operation lever 12a will be called a third path L3, and a path of the lateral movement of the right operation lever 12b will be called a fourth path L4. The first path L1 and the third path L3 connect at a junction point JP. The second path L2 and the fourth path L4 connect at a junction point JP. The first path L1 and the third path L3 are substantially orthogonal at the junction point JP. The second path L2 and the fourth path L4 are substantially orthogonal at the junction point JP.

As illustrated in FIG. 3, a potentiometer 13 is provided near the base end of the left operation lever 12a. The potentiometer 13 on the left side of the vehicle body detects the longitudinal movement of the left operation lever 12a along the first path L1. Likewise, a potentiometer 13 is provided near the base end of the right operation lever 12b. The potentiometer 13 on the right side of the vehicle body detects the longitudinal movement of the right operation lever 12b along the second path L2. Each potentiometer 13 is connected to a controller 50, and data of respective movement amounts of the left operation lever 12a and the right operation lever 12b are transmitted to the controller 50.

Furthermore, a limit switch 14 is provided near the base end of the left operation lever 12a. The limit switch 14 on the left side of the vehicle body detects the left operation lever 12a being positioned in a specific position (a first detection position) set in the third path L3. Likewise, a limit switch 14 is provided near the base end of the right operation lever 12b. The limit switch 14 on the right side of the vehicle body detects the right operation lever 12b being positioned in a specific position (a second detection position) set in the fourth path L4. Each limit switch 14 is connected to the controller 50, and detection signals from the limit switches 14 are transmitted to the controller 50.

The travel motor unit 5 is connected to the controller 50 via a motor driver unit 15. As described above, the travel motor unit 5 supplies rotational drive power to the rear wheel unit 2, and the travel motor unit 5 includes a left motor and a right motor. The motor driver unit 15 includes a left driver for the left motor and a right driver for the right motor. A wheel control module 60 is configured in the controller 50. Control signals from the controller 50 to the motor driver unit 15 are generated by the wheel control module 60.

The controller 50 controls the rotation of the travel motor unit 5 on the basis of the longitudinal movement of the operation lever unit 12. Specifically, the further the left operation lever 12a moves forward from the junction point JP in the first path L1, the higher the forward rotation speed of the left rear wheel becomes. Additionally, the further the left operation lever 12a moves rearward from the junction point JP in the first path L1, the higher the reverse rotation speed of the left rear wheel becomes. Likewise, the further the right operation lever 12b moves forward from the junction point JP in the second path L2, the higher the forward rotation speed of the right rear wheel becomes. Additionally, the further the right operation lever 12b moves rearward from the junction point JP in the second path L2, the higher the reverse rotation speed of the right rear wheel becomes. The position of the junction point JP of the left operation lever 12a, and the position of the junction point JP of the right operation lever 12b, are neutral positions where drive power is not supplied to the travel motor unit 5. A state in which drive power is not supplied to the travel motor unit 5 will be called a "neutral state".

Each junction point JP functions as a neutral position where the transmission of rotational drive power to the rear wheel unit 2 is set to zero. Accordingly, when the left operation lever 12a is positioned in the third path L3, the transmission of rotational drive power to the left rear wheel is zero and the neutral state is maintained. Likewise, when the right operation lever 12b is positioned in the fourth path L4, the transmission of rotational drive power to the right rear wheel is zero and the neutral state is maintained.

As illustrated in FIG. 3, a parking brake 16 is interposed between the travel motor unit 5 and the rear wheel unit 2. The parking brake 16 includes a left brake and a right brake. The left brake is interposed between the left motor and the left rear wheel. The right brake is interposed between the right motor and the right rear wheel. The parking brake 16 is connected to the controller 50 via a brake driver 17. A parking brake operating module 70 is configured in the controller 50. Control signals from the controller 50 to the brake driver 17 are generated by the parking brake operating module 70. In this embodiment, the parking brake 16 is constituted by an electromagnetic brake.

In this embodiment, a variable traveling power supply apparatus PSU supplies rotational drive power to the rear wheel unit 2 on the basis of the movement position of the operation lever unit 12. The variable traveling power supply apparatus PSU is constituted by the travel motor unit 5, the parking brake 16, and a transmission mechanism (not shown). The transmission mechanism includes a transmission shaft, transmission gears, and the like.

When the left operation lever 12a reaches the first detection position and the left-side limit switch 14 turns on, and the right operation lever 12b reaches the second detection position and the right-side limit switch 14 turns on, the parking brake operating module 70 causes the left brake and the right brake of the parking brake 16 to operate (brake on). As a result, the parking brake 16 operates and the traveling vehicle body enters a parked state.

As illustrated in FIG. 2, the left operation lever 12a rises from the left side of the driver's seat 3, and bends toward a centerline of the vehicle body in the lateral direction of the vehicle body. A grip is formed in a tip region of the bent part of the left operation lever 12a. Likewise, the right operation lever 12b rises from the right side of the driver's seat 3, and bends toward the centerline of the vehicle body in the lateral direction of the vehicle body. A grip is formed in a tip region of the bent part of the right operation lever 12b. In other words, the grip on the left operation lever 12a and the grip on the right operation lever 12b face each other, and interfere with the exit passage of the driver exiting the driver's seat 3. When the left operation lever 12a moves laterally outward from the vehicle body along the third path L3 and the right operation lever 12b moves laterally outward from the vehicle body along the fourth path L4, a gap between the grip on the left operation lever 12a and the grip on the right operation lever 12b widens. This opens the exit passage for the driver to exit the vehicle. Accordingly, when the driver exits the vehicle, the left operation lever 12a moves laterally outward from the vehicle body along the third path L3 and the right operation lever 12b moves laterally outward from the vehicle body along the fourth path L4. It would be convenient for the parking brake 16 to operate at the point in time when the left operation lever 12a and the right operation lever 12b move laterally outward from the vehicle body.

The method of releasing this parking brake 16 will be described in the following first to sixth embodiments.

A first embodiment of releasing the parking brake will be described first. The parking brake operating module 70 is configured or programmed to release the parking brake 16 (brake off) when the left operation lever 12a of the operation lever unit 12 being moved out of the first detection position in the third path L3 has been detected from the detection signal from the limit switch 14 or when the right operation lever 12b being moved out of the second detection position in the fourth path L4 has been detected from the detection signal from the limit switch 14.

A second embodiment of releasing the parking brake will be described next. The parking brake operating module 70 is configured or programmed to release the parking brake 16 (brake off) when the left operation lever 12a of the operation lever unit 12 being moved out of the first detection position in the third path L3 has been detected from the detection signal from the limit switch 14 and when the right operation lever 12b being moved out of the second detection position in the fourth path L4 has been detected from the detection signal from the limit switch 14.

A third embodiment of releasing the parking brake will be described next. Unlike the first and second embodiments, in this embodiment, the parking brake 16 is not released by behavior of the left operation lever 12a in the third path L3 or behavior of the right operation lever 12b in the fourth path L4. The parking brake 16 is released by behavior of the left operation lever 12a in the first path L1 or by behavior of the right operation lever 12b in the second path L2. Such behavior of the operation lever unit 12 is detected from detection signals from the potentiometers 13. Specifically, the parking brake operating module 70 is configured or programmed to release the parking brake 16 in response to movement in a predetermined range along the first path L1 as the behavior of the left operation lever 12a, movement in a predetermined range along the second path L2 as the behavior of the right operation lever 12b, or both, when the parking brake 16 is in an operational state. This predetermined range is predetermined angular movement in a forward direction or a rearward direction from the junction point JP.

A fourth embodiment of releasing the parking brake will be described next. This embodiment is a variation on the third embodiment. In the fourth embodiment, the parking brake operating module 70 is configured or programmed to release the parking brake 16 in response to movement of the left operation lever 12a along the first path L1 from the neutral position (the junction point JP) exceeding a predetermined movement rate, movement of the right operation lever 12b along the second path L2 from the neutral position exceeding a predetermined movement rate, or both, when the parking brake 16 is in an operational state. The movement rate of the left operation lever 12a indicates the movement amount of the left operation lever 12a per unit of time. The movement rate of the right operation lever 12b indicates the movement amount of the right operation lever 12b per unit of time. Note that the movement rate may indicate an acceleration of the movement of each of the left operation lever 12a and the right operation lever 12b. The movement rate is calculated by a differential calculator of the parking brake operating module 70, to which the signals from the potentiometers 13 are input. The predetermined movement rate is a pre-set threshold for the movement amount. The predetermined movement rate is normally set on the basis of the operation behavior on the operation lever unit 12 when the driver begins driving from a parked state.

Figure 5:
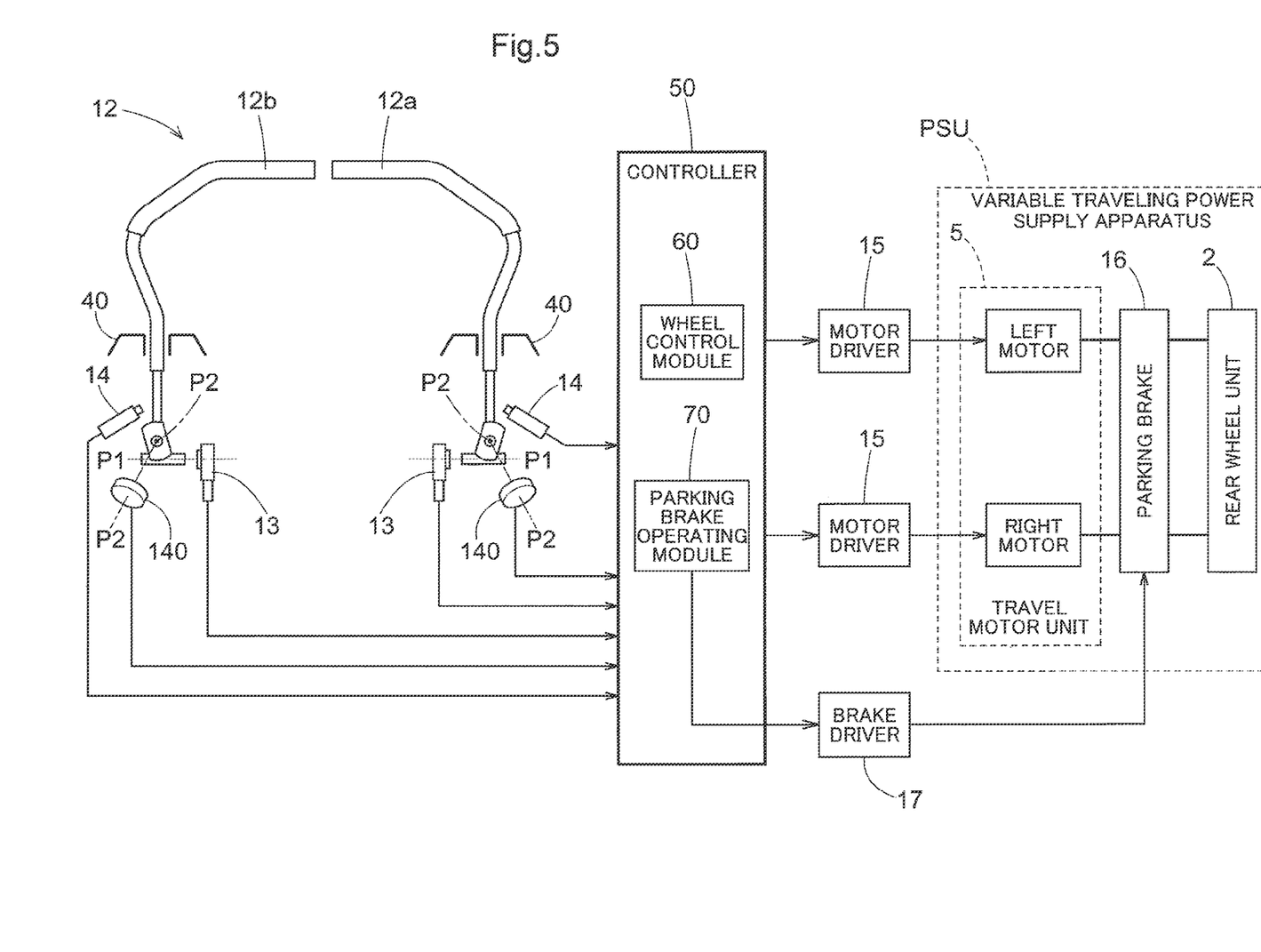
FIG. 5 is a function block diagram illustrating another embodiment.

A fifth embodiment of releasing the parking brake will be described next. This embodiment is similar to the third embodiment. In the third embodiment, the parking brake operating module 70 releases the parking brake 16 in response to movement of the left operation lever 12a in a predetermined range along the first path L1, movement of the right operation lever 12b in a predetermined range along the second path L2, or both. In contrast, in the fifth embodiment, the parking brake operating module 70 is configured or programmed to release the parking brake 16 in response to movement of the left operation lever 12a in a predetermined range along the third path L3, movement of the right operation lever 12b in a predetermined range along the fourth path L4, or both. Accordingly, in the fifth embodiment, as illustrated in FIG. 5, lateral potentiometers 140 are provided for detecting lateral movement (movement along the third path L3 and the fourth path L4), which is swinging movement of the left operation lever 12a and the right operation lever 12b of the operation lever unit 12 about the respective second swing axes P2. These lateral potentiometers 140 are connected to the controller 50, and the parking brake operating module 70 can sequentially detect lateral movement of the left operation lever 12a and the right operation lever 12b. Accordingly, the parking brake operating module 70 can release the parking brake 16 by detecting lateral movement of a predetermined angle from the neutral position of the operation lever (the junction point JP).

A sixth embodiment of releasing the parking brake will be described next. This embodiment is a variation on the fifth embodiment. In the sixth embodiment, the parking brake operating module 70 is configured or programmed to release the parking brake 16 in response to movement of the left operation lever 12a along the third path L3 from the neutral position exceeding a predetermined movement rate, movement of the right operation lever 12b along the fourth path L4 from the neutral position exceeding a predetermined movement rate, or both, when the parking brake 16 is in an operational state. The movement rate of the left operation lever 12a indicates the displacement amount of the left operation lever 12a per unit of time. The movement rate of the right operation lever 12b indicates the movement amount of the right operation lever 12b per unit of time. Note that the movement rate may indicate an acceleration of the movement of each of the left operation lever 12a and the right operation lever 12b. The movement rate is calculated by a differential calculator of the parking brake operating module 70, to which the signals from the lateral potentiometers 140 are input. The predetermined movement rate is a pre-set threshold for the movement amount. The predetermined movement rate is normally set on the basis of the operation behavior on the operation lever unit 12 when the driver begins driving from a parked state.

Other Embodiments

The present invention is not limited to the configurations described as examples in the foregoing embodiments (the first to sixth embodiments of the parking brake 16), and examples of other representative embodiments of the present invention will be given hereinafter.

In the foregoing embodiments, the front wheel unit 1 and the rear wheel unit 2 are provided as a travel apparatus, and the travel motor unit 5 is provided as a drive apparatus that drives the travel apparatus. However, the configuration is not limited thereto. For example, a crawler-type travel apparatus, a travel apparatus that combines mini crawlers and wheels, or the like may be provided instead. Additionally, a continuously-variable transmission apparatus that drives the travel apparatus by inputting drive power from an engine, shifting the input drive power, and transmitting the drive power to the travel apparatus may be provided.

(2) In the foregoing embodiments, the parking brake 16 is constituted by an electromagnetic brake. However, another brake structure may be employed instead, such as a mechanical brake operated by an electric actuator.

(3) In the foregoing embodiments, an operation lever that swings about a swing fulcrum is described as an operation implement. However, another type of operation implement, such as sliding type operation implement, may be used instead.

(4) In the foregoing embodiments, limit switch-type or potentiometer-type detectors are used to detect the behavior of the operation lever unit 12 in each path. However, magnetic detectors, optical detectors, or the like may be used instead.

(5) In the first to fifth embodiments of the parking brake release described above, the parking brake operating module 70 is configured or programmed to release the parking brake 16. However, the configuration is not limited to these embodiments. For example, the configuration may be such that separate from the controller 50, a release mechanism that releases the parking brake 16 is provided in the variable traveling power supply apparatus PSU. The configuration may be such that when at least one of the release conditions in the first to fifth embodiments is satisfied, the release mechanism operates mechanically interlocking with the movement of the left operation lever 12a and the right operation lever 12b, and the parking brake 16 is released.

The present invention can be applied in various types of work vehicles, such as transport vehicles, and the like, in addition to mowing machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A self-driving work vehicle comprising:
a front wheel unit;
a rear wheel unit including a left rear wheel and a right rear wheel;
a variable traveling power supply apparatus that supplies rotational drive power to the left rear wheel and the right rear wheel independently;
a left operation implement movable along a first path to adjust a rate of the rotational drive power to be supplied to the left rear wheel from the variable traveling power supply apparatus;
a right operation implement movable along a second path to adjust a rate of the rotational drive power to be supplied to the right rear wheel from the variable traveling power supply apparatus;
a parking brake provided for the variable traveling power supply apparatus; and
a controller configured or programmed to cause a parking brake operating module to operate the parking brake in response to (i) the left operation implement being moved to a third path branching from the first path and (ii) the right operation implement being moved to a fourth path branching from the second path,
wherein in an operational state of the parking brake, the parking brake becomes released in response to at least either of (i) the left operation implement being moved from a neutral position to exceed a predetermined movement rate along the first path and (ii) the right operation implement being moved from a neutral position to exceed a predetermined movement rate along the second path.

2. The self-driving work vehicle according to claim 1, wherein movement of the left operation implement along the third path and movement of the right operation implement along the fourth path expand an exit passage for a driver to exit the self-driving work vehicle.

3. The self-driving work vehicle according to claim 1, wherein the third path has a first detection position, the fourth path has a second detection position, and the controller is configured or programmed to cause the parking brake operating module to operate the parking brake in response to (i) the left operation implement being moved to the first detection position and (ii) the right operation implement being moved to the second detection position.

* * * * *